United States Patent
Flores et al.

(10) Patent No.: US 10,332,161 B2
(45) Date of Patent: Jun. 25, 2019

(54) RETRIEVING REVIEWS BASED ON USER PROFILE INFORMATION

(71) Applicant: International Business Machines Corporation, Armonk, NY (US)

(72) Inventors: Romelia H. Flores, Keller, TX (US); Erik H. Katzen, Argyle, TX (US)

(73) Assignee: International Business Machines Corporation, Armonk, NY (US)

( * ) Notice: Subject to any disclaimer, the term of this patent is extended or adjusted under 35 U.S.C. 154(b) by 1131 days.

(21) Appl. No.: 14/297,112

(22) Filed: Jun. 5, 2014

(65) Prior Publication Data

US 2015/0356640 A1    Dec. 10, 2015

(51) Int. Cl.
  *G06Q 30/06* (2012.01)
  *G06Q 30/02* (2012.01)

(52) U.S. Cl.
  CPC ..... *G06Q 30/0282* (2013.01); *G06Q 30/0625* (2013.01); *G06Q 30/0631* (2013.01)

(58) Field of Classification Search
  CPC .............................. G06Q 30/06–08
  USPC .............................. 705/26.1–27.2
  See application file for complete search history.

(56) References Cited

U.S. PATENT DOCUMENTS

| | | | |
|---|---|---|---|
| 7,752,082 B2 | 7/2010 | Calabria | |
| 7,962,461 B2 | 6/2011 | Ruhl et al. | |
| 8,407,286 B2 | 3/2013 | Punera et al. | |
| 8,903,811 B2 | 12/2014 | Hueter et al. | |
| 2006/0143067 A1* | 6/2006 | Calabria | G06Q 10/10 705/26.1 |
| 2007/0078669 A1 | 4/2007 | Dave et al. | |
| 2007/0244888 A1 | 10/2007 | Chea et al. | |
| 2011/0055040 A1* | 3/2011 | Foster | G06Q 30/02 705/26.3 |
| 2011/0270777 A1 | 11/2011 | Weiser | |
| 2013/0144802 A1 | 6/2013 | Bank et al. | |

OTHER PUBLICATIONS

Duarte et al., "Towards an intelligent reviewer's assistant: recommending topics to help users to write better product reviews", Proceedings of the 2012 ACM international conference on Intelligent User Interfaces, IUI '12, Feb. 14-17, 2012, ACM 978-1-4503-1048-2/12/02.

Lu, et al., "Exploiting Social Context for Review Quality Prediction", WWW 2010, Apr. 26-30, 2010, ACM 978-1-60558-799-8/10/04.

\* cited by examiner

*Primary Examiner* — Ming Shui
(74) *Attorney, Agent, or Firm* — Daniel R. Simek

(57) ABSTRACT

In an approach to retrieving reviews for a user based on user profile information, a computer receives user profile information for a first user. The computer receives a search term from the first user and determines review information corresponding to the search term and the user profile information. Responsive to determining review information corresponding to the search term and the user profile information, the computer retrieves the review information and transmits the review information to the first user.

17 Claims, 4 Drawing Sheets

RETRIEVING REVIEWS BASED ON USER PROFILE INFORMATION

BACKGROUND OF THE INVENTION

The present invention relates generally to the field of data processing systems, and more particularly to retrieving reviews for a user based on user profile information.

Often, before making a purchase or other planning decision, such as taking a vacation, people check reviews online in order to utilize the experiences that others have shared. These experiences are usually found on a multitude of websites and resources that list reviews and advice for products, services, experiences, activities, interests, and hobbies. Reviews may include detailed information from experts who have used the product or had the experience, or public reviews available from other users for certain products and experiences. The number of reviews available can be overwhelming and may create a cumbersome task for the user to sift through the reviews for information relevant for the user's planned usage and preferences.

SUMMARY

Embodiments of the present invention disclose a method, a computer program product, and a computer system for retrieving reviews for a user based on user profile information. The method includes a computer receiving user profile information for a first user and receiving a search term from the first user. The computer determines review information corresponding to the search term and the user profile information, and responsive to determining review information corresponding to the search term and the user profile information, the computer retrieves the review information. The computer then transmits the review information to the first user.

DETAILED DESCRIPTION

Figure 1:
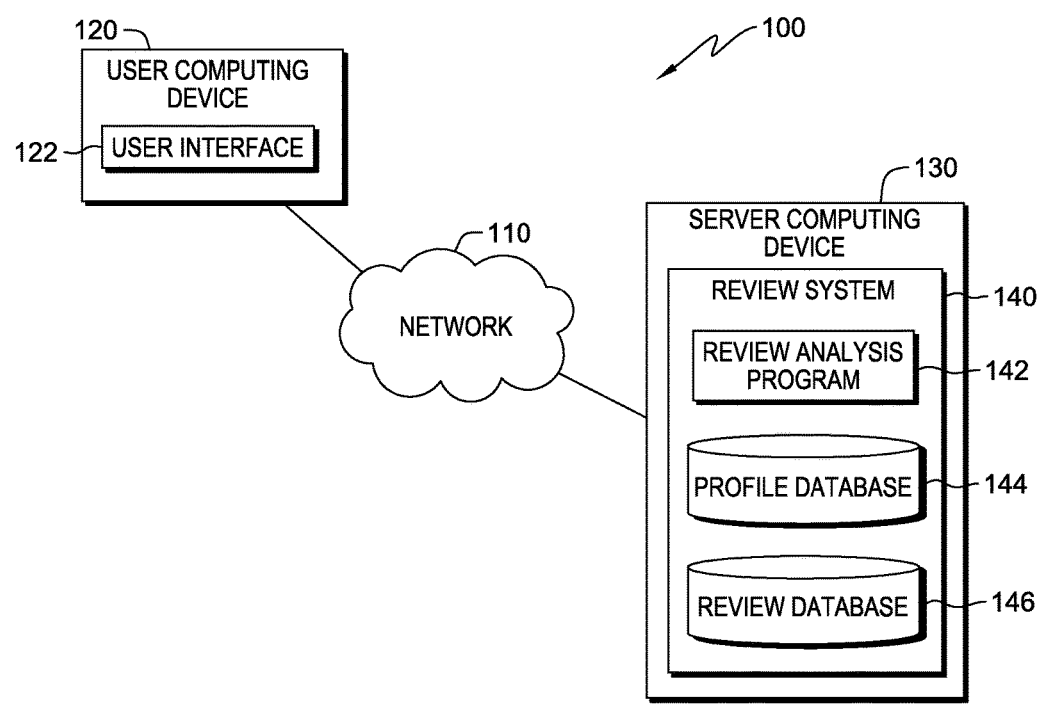
FIG. 1 is a functional block diagram illustrating a distributed data processing environment, in accordance with an embodiment of the present invention.

The present invention will now be described in detail with reference to the Figures. FIG. 1 is a functional block diagram illustrating a distributed data processing environment, generally designated 100, in accordance with an embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes user computing device 120 and server computing device 130, interconnected via network 110. Network 110 can be, for example, a local area network (LAN), a telecommunications network, a wide area network (WAN), such as the Internet, a virtual local area network (VLAN), or any combination of the four, and can include wired, wireless, or fiber optic connections. In general, network 110 can be any combination of connections and protocols that will support communications between user computing device 120 and server computing device 130, in accordance with embodiments of the present invention.

In various embodiments of the present invention, user computing device 120 may be a laptop computer, a tablet computer, a personal digital assistant (PDA), a smart phone, or any programmable electronic device or combination of electronic devices capable of executing machine readable program instructions and of communicating with server computing device 130 via network 110 and with various other components within distributed data processing environment 100. User computing device 120 includes user interface (UI) 122.

UI 122 may be, for example, a graphical user interface (GUI), a web user interface (WUI), or a touchscreen, and can display text, documents, instant message applications, user options, instructions for operation, and other application interfaces and accept user input. A user interface, such as UI 122, refers to the information (such as graphics, text, and sound) an application presents to a user and the control sequences the user employs to control the application. There are many types of user interfaces. In an embodiment, UI 122 is a GUI, which is a type of interface that allows users to interact with electronic devices, such as a computer keyboard and mouse, through graphical icons and visual indicators. The actions in GUIs are often performed through direct manipulation of the graphical elements. In various embodiments, UI 122 is the interface between user computing device 120 and review analysis program 142.

Server computing device 130 includes review system 140, review analysis program 142, profile database 144 and review database 146. In various embodiments, server computing device 130 may be a management server, a web server, a mobile computing device, or any other electronic device or computing system capable of receiving and sending data. In other embodiments, server computing device 130 may represent a server computing system utilizing multiple computers as a server system, such as in a cloud computing environment. In another embodiment, server computing device 130 may be a laptop computer, a tablet computer, a netbook computer, a personal computer (PC), a desktop computer, or any programmable electronic device capable of communicating with user computing device 120 via network 110. In another embodiment, server computing device 130 represents a computing system utilizing clustered computers and components (e.g., database server computer, application server computers, etc.) that act as a single pool of seamless resources when accessed within mobile computing environment 100. Server computing device 130 provides support for operations and service for user computing device 120 and between the device 120 and various other components (not shown) within distributed data processing environment 100 via network 110. In an embodiment, each of the programs and databases included on server computing device 130 may be located on user computing device 120, or elsewhere within distributed data processing environment 100 with access via network 110. Server computing device 130 may include internal and external hardware components, as depicted and described with reference to FIG. 4.

Review system 140 is a website, company, or other service that contains reviews and advice for products, services, experiences, activities, hobbies, and any other topic a user might review. In embodiments, review system 140 may be an existing review website containing an existing storage of user reviews of products. In other embodiments, review system 140 may be a new review website initially containing no storage of user reviews, and the storage must be built as users review products and services available through the website. Users and review authors register with review system 140 and upon registering, enter initial profile information, such as gender, age, and geographic location.

Review analysis program 142 operates within review system 140 and receives a search term, either for a product, service, or other good that users may review within review system 140, such as a vacation location or resort. Review analysis program 142 searches for the term in a database containing information on various products and services, reviews, and advice, and also utilizes a search engine via network 110 to obtain relevant characteristics and information about the search term, for example, a search for a computer brand may return battery requirements and user accessibility options. Review analysis program 142 determines questions related to the search term, including the planned usage and intended user of the searched product or service, and presents the questions to the user performing the search. A question may be, for example, whether battery life is an important factor for the user.

Upon receiving a response to the questions, review analysis program 142 stores and analyzes each response to determine whether information in a database, such as review database 146 on server computing device 130, corresponds to the response. For example, if a user responds that battery life is more important than media capabilities for a laptop computer, review analysis program 142 determines whether any reviews or advice for laptop computers contain high ratings on battery life. Review analysis program 142 also uses the user's initial profile information to determine whether any review authors have a similar profile or background. If there is corresponding information, or any reviews from an author with a similar profile, review analysis program 142 creates a list of the review information to present to the user. The list of review information may include review items such as, for example, a product review from a review author with a similar profile, a product review of a related product, or a service review of an unrelated service, but written by a review author with a similar profile. In an embodiment, review analysis program 142 searches for additional products or services reviewed by the most similar review author, and transmits a recommendation for the similar products and services, and the associated reviews, to the user. For example, a search for a laptop computer with high battery life may return a similar tablet computer that has been reviewed as having high battery life.

Profile database 144 stores initial information on each user utilizing review analysis program 142, such as gender, age, profession, and geographic location that a user enters upon creating a profile with a review website or company. Additional information may be stored separately from the initial information, such as physical attributes, interests, hobbies, schools attended, preferred types of food and vacation preferences. As each user provides responses to questions determined by review analysis program 142, additional user preferences are added to the additional information stored in profile database 144. For example, review analysis program 142 may ask a user for preferences regarding flexibility with cost with respect to improved product quality. Also stored in profile database 144 are profiles created by review authors upon entering a review with the review website or company. The author profiles can contain initial information, such as gender and profession, and additional information, such as interests and hobbies.

In an embodiment, a user may create multiple user profiles to be stored in profile database 144. For example, a user may create a profile for his or her own preferences for personal purchases, and additionally create profiles for family members and friends which include the preferences of each other person. The user can then search for products and services for another, for example, as a gift. In various embodiments, review analysis program 142 may perform natural language processing, or other known methods, on the text of reviews and advice in review database 146 to determine whether the text is part of a review category, or an advice category, and determine information for the user based on whether the user's profile includes preferences for reviews or advice.

Review database 146 contains reviews written for various products and services provided by review system 140. In embodiments, review database 146 can store product information associated with each review. In another embodiment, review database 146 may contain an update system for review authors in order to keep product reviews current. A review author may set preferences when writing a review to be reminded when to update a review, for example, every two months, allowing the review to be updated for wear and tear on a product. In an embodiment, the update system may include an advice column containing learned information about the product or use of the product.

Figure 2:
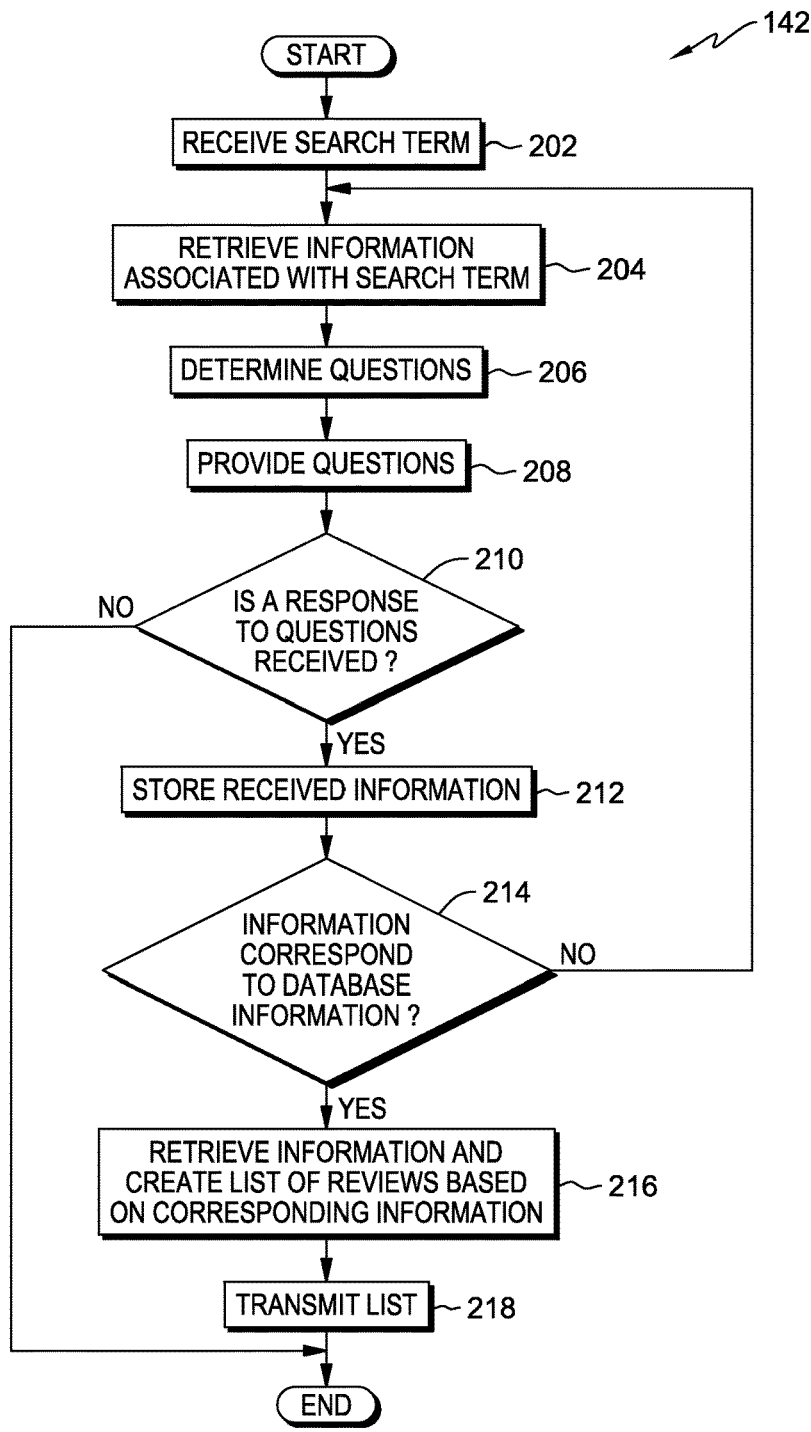
FIG. 2 is a flowchart depicting operational steps of a review analysis program for determining corresponding information between a user profile and characteristics of a review in order to provide a list of relevant reviews to the user, in accordance with an embodiment of the present invention.

FIG. 2 is a flowchart depicting operational steps of review analysis program 142 for determining corresponding information between a user profile and characteristics of a review in order to provide a list of relevant reviews to the user, in accordance with an embodiment of the present invention.

Review analysis program 142 receives a search term from a user (step 202). A user accesses review system 140 and inputs a search term, which may include, for example, a product, a service, an interest, or a hobby of the user on which the user is interested in obtaining review and advice. Additionally, the user, when accessing review system 140, creates a user profile containing initial information, such as gender, geographic location, age, or profession.

Review analysis program 142 retrieves information associated with the search term (step 204). Review analysis program 142 searches review database 146 for information regarding the searched term, for example, a product, and additionally searches the Internet, via network 110, for characteristics and components associated with the searched term that users consider when making a decision regarding the product. The search may use natural language processing techniques and analysis to determine a match rate between the searched term and categories other users consider when making a purchase or decision. Review analysis program 142 can determine a match rate between the searched term and each category or characteristic associated with the searched term that other users considered, resulting in a search term having multiple match rates pertaining to a different component or characteristic. In an embodiment, review analysis program 142 retrieves information within a threshold matching rate, for example, a 70% match rate between the searched term and the retrieved information. The retrieved information is stored in review database 146.

Review analysis program 142 determines questions regarding the retrieved information and search term (step 206). Review analysis program 142 can take as input the searched term and the retrieved information, and return questions regarding the searched term. For example, the questions may be in multiple choice format. Review analysis program 142 can determine an amount of questions to ask, for example, at least one or a set of questions, and categories for the questions based on the match rate. For example, review analysis program 142 may retrieve information indicating that planned computer usage is the most important factor users consider when purchasing a computer, followed by battery life and screen size. The determined questions may then include the following: "What do you use your computer for?" with choices given as "a. word processing; b. video games; c. software development." In an embodiment, step 204 and 206 may be performed by a separate module and the information then provided to review analysis program 142.

Review analysis program 142 provides the questions to a user (step 208). The questions can be transmitted to the user in the form of a survey or questionnaire, for example, displayed on UI 122.

Review analysis program 142 determines whether a response to the questions is received from the user (decision block 210). If no response is received (decision block 210, "no" branch), review analysis program 142 ends processing. If a response is received (decision block 210, "yes" branch), review analysis program 142 stores the received information (step 212). The received information is stored along with the user profile information and user preferences in profile database 144.

Review analysis program 142 determines whether the received information corresponds to information stored in a database, such as review database 146 (decision block 214). Corresponding information can include review items and information, for example, reviews or advice which match characteristics of the product or service that the user rated highly, or reviews or advice on the product or service created by other users of review system 140, such as review authors, with a profile containing matching or similar characteristics as those of the user. In an embodiment, review analysis program 142 searches review database 146 for reviews of additional products or services written by the matched review authors. For example, a user searching for reviews of a laptop computer may have a similar profile as Author X, and Author X may have also reviewed a laptop case for the computer, which the user may find helpful or appealing based on the similarly matched profile. If the received information does not correspond to stored information (decision block 214, "no" branch), review analysis program 142 returns to retrieve further information associated with the search term (step 204) and to provide further questions to the user in order to obtain more information with which to search review database 146.

If the received information does correspond to stored information (decision block 214, "yes" branch), review analysis program 142 retrieves the information and creates a list of review results based on the corresponding information (step 216). In various embodiments, the created list of reviews may be sorted or ranked. For example, corresponding information, such as a determination of a matching review author profile or a product recommendation, can be used to provide reviews and product recommendations associated with the matching review author. The review results can then be ranked, according to how closely the profiles matched, for example, the best matched review author profile reviews are ranked above those reviews by review authors with less in common with the user. In another example, a review author with a closer matched profile than another review author is ranked higher than the other review author. In an embodiment, a user may also set a preference for a particular reviewer, and as review analysis program 142 determines correlating reviewer information in review database 146, reviews from the particular reviewer are ranked higher than others and presented at the top of the review results.

Review analysis program 142 transmits the created list to the user (step 218). The list of reviews and advice corresponding to the user's search can be displayed to the user, for example, on UI 122.

In an embodiment, review analysis program 142 presents an evaluation system to the user on UI 122, allowing the user to evaluate and select whether displayed reviews are helpful or not. Review analysis program 142 can analyze, for example, the format and structure of the displayed reviews, store the evaluation and structure data along with other user preferences in profile database 144, and use a learning process to include the information for future searches. For example, a user may favorably rate a review in a bulleted format, and unfavorably rate a review in paragraph format. Review analysis program 142 can incorporate the structure of the review in determining reviews and advice, and creating a list of reviews to transmit to the user.

Figure 3:
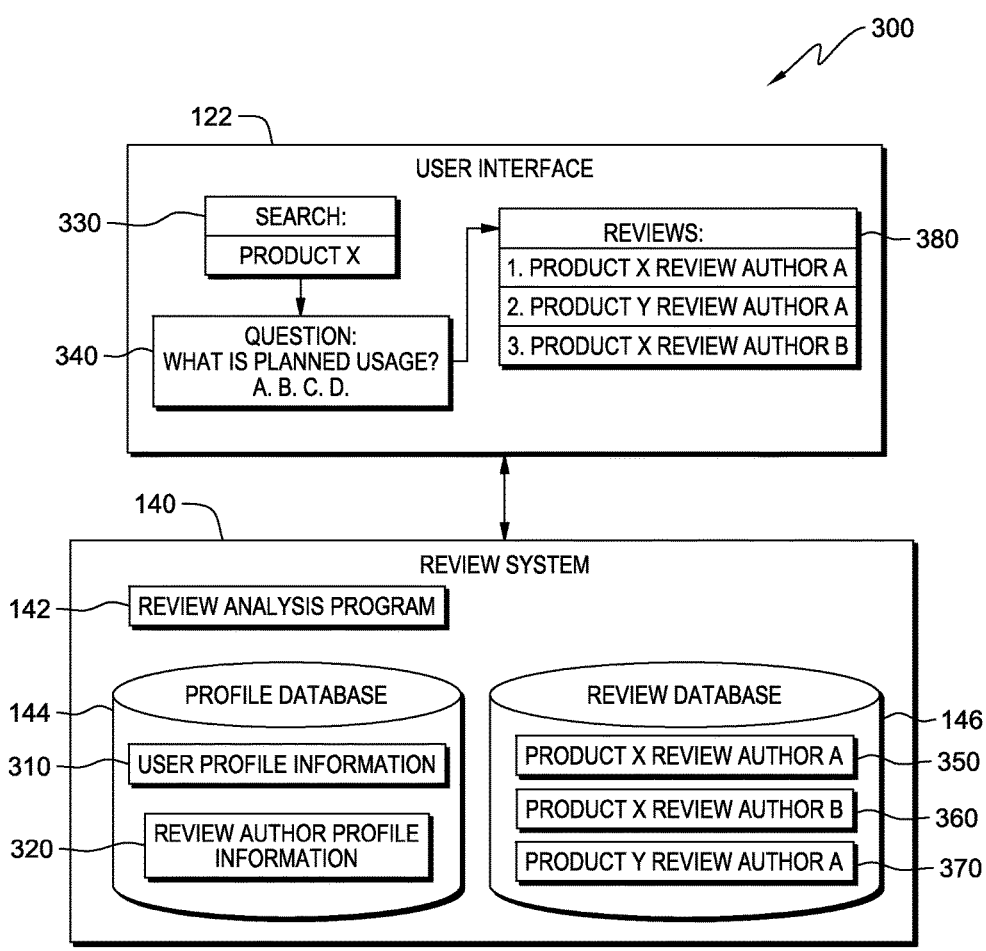
FIG. 3 depicts an exemplary diagram illustrating an operation of the review analysis program of FIG. 2, in accordance with an embodiment of the present invention.

FIG. 3 depicts an exemplary diagram 300 illustrating an operation of review analysis program 142, in accordance with an embodiment of the present invention.

Diagram 300 includes UI 122 and review system 140, each on respective computing devices as discussed above with reference to FIG. 1. Each user and review author creates a user profile within review system 140, depicted as profile information 310 and review author profile information 320. A user then enters a search term for a product of interest, shown in search 330 as a search for reviews of "Product X." Review analysis program 142 performs a search via the internet and within review database 146 and returns one or more questions regarding categories other users have considering when purchasing Product X. A question is presented to the user, depicted in question 340, and the response is added to the user profile in profile database 144. In other embodiments, question 340 may be a set of questions based on the data and analysis performed by review analysis program 142.

Review analysis program 142 determines whether information corresponding to the user profile and to the product is found in review database 146, such as reviews from a review author with profile information similar to the user. In the illustrated example, Review Author A is the best matched profile to the user, and has written a review on Product X, depicted as review 350. Additionally, review analysis program 142 determines Review Author A has written another review for Product Y, depicted as review 370 in review database 146. Review database 146 also contains additional reviews on Product X, for example, review 360 written by Review Author B. Each of the reviews by Review Author A are presented to the user, in reviews 380, in a ranked list, with the most relevant review, that for Product X, ranked first, followed by additional reviews from the best matched review author.

Figure 4:
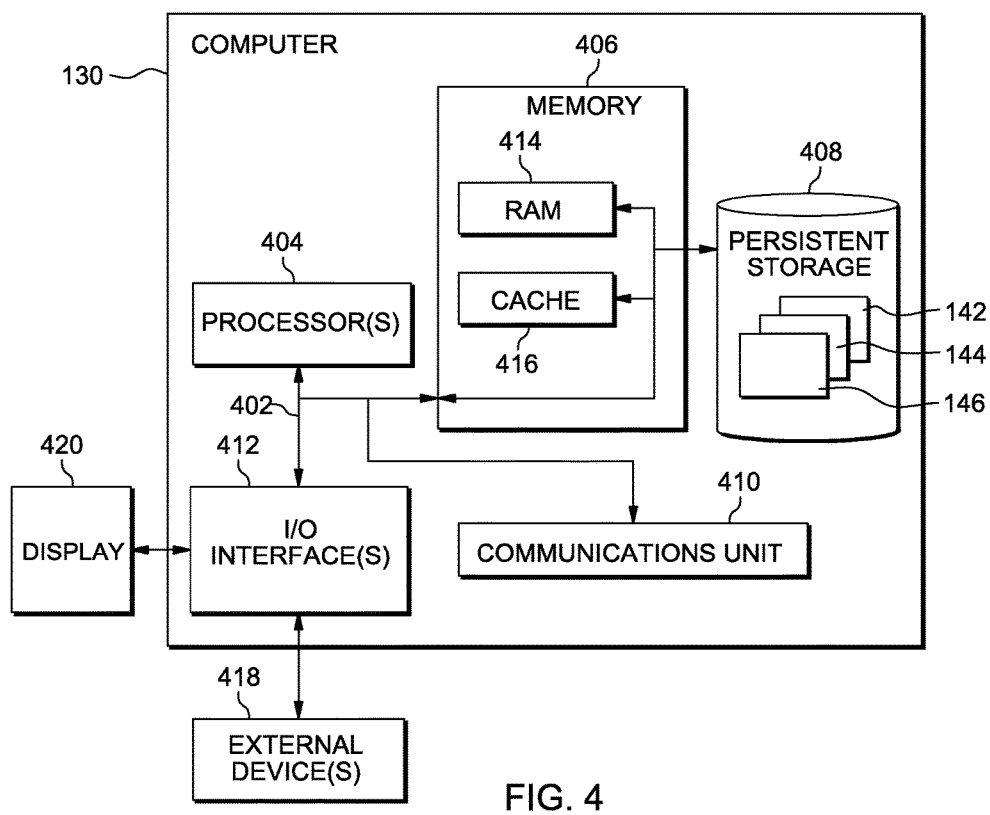
FIG. 4 depicts a block diagram of components of a data processing system, such as the server computing device of FIG. 1, in accordance with an embodiment of the present invention.

FIG. 4 depicts a block diagram of components of server computing device 130 in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Server computing device 130 includes communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer-readable storage media. In this embodiment, memory 406 includes random access memory (RAM) 414 and cache memory 416. In general, memory 406 can include any suitable volatile or non-volatile computer-readable storage media. In various embodiments, review analysis program 142 can be loaded and executed in RAM 414 and cache memory 416.

In the depicted embodiment, review analysis program 142, profile database 144 and review database 146 are stored in persistent storage 408 for execution and/or access by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid state hard drive, a semiconductor storage device, a read-only memory (ROM), an erasable programmable read-only memory (EPROM), a flash memory, or any other computer-readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer-readable storage medium that is also part of persistent storage 408.

Communications unit 410, in these examples, provides for communications with other data processing systems or devices, including server computing device 130. In these examples, communications unit 410 includes one or more network interface cards. Communications unit 410 may provide communications through the use of either or both physical and wireless communications links. Review analysis program 142, profile database 144 and review database 146 may be downloaded to persistent storage 408 through communications unit 410.

I/O interface(s) 412 allows for input and output of data with other devices that may be connected to server computing device 130. For example, I/O interface(s) 412 may provide a connection to external device(s) 418 such as a keyboard, a keypad, a touch screen, a microphone and/or some other suitable input device. External device(s) 418 can also include portable computer-readable storage media such as, for example, thumb drives, portable optical or magnetic disks, and memory cards. Software and data used to practice embodiments of the present invention, e.g., review analysis program 142, profile database 144, and review database 146, can be stored on such portable computer-readable storage media and can be loaded onto persistent storage 408 via I/O interface(s) 412. I/O interface(s) 412 also connect to a display 420. Display 420 provides a mechanism to display data to a user and may be, for example, a computer monitor or an incorporated display screen, such as is used in tablet computers and smart phones.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for retrieving review information, the computer-implemented method comprising:

receiving, by the one or more computer processors, user profile information of a first user;

performing, by the one or more computer processors, an online search for reviews, based on a search term received from the first user;

receiving, by the one or more computer processors, review information corresponding to the search term;

determining, by the one or more computer processors, whether the review information includes profile information of a review author and characteristics corresponding to the search term;

generating and presenting questions, by the one or more computer processors, to the first user, based on the search term and the characteristics of review information corresponding to the search term;

adding, by the one or more computer processors, a response to the questions presented to the first user to the profile information of the first user;

responsive to determining the review information corresponding to the search term includes user profile information of the review author, and the review information includes characteristics corresponding to the search term, identifying, by the one or more computer processors, multiple match rates to the search term and the profile information of the first user, wherein a match rate of the multiple match rates is associated with a characteristic of the search term other users that author reviews considered in making a decision regarding the search term and the user profile information of the review author;

retrieving, by the one or more computer processors, one or more reviews within a specified threshold match rate; and transmitting, by the one or more computer processors, the review information within the specified threshold match rate, to the first user.

2. The method of claim 1, wherein determining, by the one or more computer processors, at least one question regarding the information and the search term further comprises:

determining, by the one or more computer processors, a match rate between the search term and one or more characteristics associated with the search term;

ranking, by the one or more computer processors, the one or more characteristics based, at least in part, on the match rate; and determining, by the one or more computer processors, the at least one question based, at least in part, on the ranking of the one or more characteristics.

3. The method of claim 1, wherein determining, by the one or more computer processors, review information corresponding to the search term and the user profile information further comprises:

retrieving, by the one or more computer processors, profile information associated with a second user;

determining, by the one or more computer processors, the profile information associated with the second user matches information from the user profile information of the first user;

determining, by the one or more computer processors, the second user is associated with review information corresponding to the search term; and retrieving, by the one or more computer processors, the review information associated with the second user.

4. The method of claim 3, further comprising:

ranking, by the one or more computer processors, the review information associated with the second user higher than review information associated with at least one other user.

5. The method of claim 1, wherein transmitting, by one or more computer processors, the review information to the first user further comprises:

creating, by the one or more computer processors, a list containing the retrieved review information;

determining, by the one or more computer processors, a first item of the review information is a closer match to the user profile information than a second item of the review information; and ranking, by the one or more computer processors, the first item of the review information higher than the second item of the review information on the created list.

6. The method of claim 1, wherein the review information includes at least one of: a product review, a service review, a location review, a product advice, a service advice, and a location advice.

7. A computer program product for retrieving review information, the computer program product comprising:

one or more computer readable storage media and program instructions stored on the one or more computer readable storage media, the program instructions comprising:

program instructions to receive user profile information of a first user;

program instructions to perform an online search for reviews, based on a search term received from the first user;

program instructions to receive review information corresponding to the search term;

program instructions to determine whether the review information includes profile information of a review author and whether the review information includes characteristics corresponding to the search term;

program instructions to generate and present questions to the first user, based on the search term and the characteristics of the review information corresponding to the search term;

program instructions to add a response to the questions presented to the first user to the profile information of the first user;

responsive to determining the review information corresponding to the search term includes user profile information of the review author, and the review information includes characteristics corresponding to the search term, program instructions to identify multiple match rates to the search term and the profile information of the first user, wherein a match rate of the multiple match rates is associated with a characteristic of the search term other users that author reviews considered in making a decision regarding the search term and the user profile information of the review author;

program instructions to retrieve the review information within a specified threshold match rate; and program instructions to transmit the review information within the specified threshold match rate to the first user.

8. The computer program product of claim 7, wherein the program instructions to determine at least one question regarding the information and the search term further comprise:

program instructions to determine a match rate between the search term and one or more characteristics associated with the search term;

program instructions to rank the one or more characteristics based, at least in part, on the match rate; and program instructions to determine the at least one question based, at least in part, on the ranking of the one or more characteristics.

9. The computer program product of claim 7, wherein the program instructions to determine review information corresponding to the search term and the user profile information further comprise:

program instructions to retrieve profile information associated with a second user;

program instructions to determine the profile information associated with the second user matches information from the user profile information of the first user;

program instructions to determine the second user is associated with review information corresponding to the search term; and program instructions to retrieve the review information associated with the second user.

10. The computer program product of claim 9, further comprising:

program instructions to rank the review information associated with the second user higher than review information associated with at least one other user.

11. The computer program product of claim 7, wherein the program instructions to transmit the review information to the first user further comprise:

program instructions to create a list containing the retrieved review information;

program instructions to determine a first item of the review information is a closer match to the user profile information than a second item of the review information; and program instructions to rank the first item of the review information higher than the second item of the review information on the created list.

12. The computer program product of claim 7, wherein the review information includes at least one of: a product review, a service review, a location review, a product advice, a service advice, and a location advice.

13. A computer system for retrieving review information, the computer system comprising:

one or more computer processors; one or more computer readable storage media; program instructions stored on the one or more computer readable storage media for execution by at least one of the one or more computer processors, the program instructions comprising:

program instructions to receive user profile information for a first user;

program instructions to perform an online search for reviews, based on a search term received from the first user;

program instructions to review information corresponding to the search term;

program instructions to determine whether the review information includes profile information of a review author and whether the review information includes characteristics corresponding to the search term;

program instructions to generate and present questions to the first user, based on the search term and the characteristics of the review information corresponding to the search term;

program instructions to add a response to the questions presented to the first user to the profile information of the first user;

responsive to determining the review information corresponding to the search term includes user profile information of the review author, and the review information includes characteristics corresponding to the search term, program instructions to identify multiple match rates to the search term and the profile information of the first user, wherein a match rate of the multiple match rates is associated with a characteristic of the search term other users that author reviews considered in making a decision regarding the search term and the user profile information of the review author;

program instructions to retrieve the review information within a specified threshold match rate; and program instructions to transmit the review information within the specified threshold match rate to the first user.

14. The computer system of claim 13, wherein the program instructions to determine at least one question regarding the information and the search term further comprise: program instructions to determine a match rate between the search term and one or more characteristics associated with the search term; program instructions to rank the one or more characteristics based, at least in part, on the match rate; and program instructions to determine the at least one question based, at least in part, on the ranking of the one or more characteristics.

15. The computer system of claim 13, wherein the program instructions to determine review information corresponding to the search term and the user profile information further comprise:

program instructions to retrieve profile information associated with a second user;

program instructions to determine the profile information associated with the second user matches information from the user profile information of the first user;

program instructions to determine the second user is associated with review information corresponding to the search term; and program instructions to retrieve the review information associated with the second user.

16. The computer system of claim 15, further comprising:
program instructions to rank the review information associated with the second user higher than review information associated with at least one other user.

17. The computer system of claim 13, wherein the program instructions to transmit the review information to the first user further comprise:

program instructions to create a list containing the retrieved review information;

program instructions to determine a first item of the review information is a closer match to the user profile information than a second item of the review information; and program instructions to rank the first item of the review information higher than the second item of the review information on the created list.

* * * * *